(12) United States Patent
Kashiwagi et al.

(10) Patent No.: US 7,599,906 B2
(45) Date of Patent: Oct. 6, 2009

(54) FILE MANAGEMENT DEVICE, FILE MANAGEMENT METHOD, FILE MANAGEMENT METHOD PROGRAM, AND RECORDING MEDIUM THE FILE MANAGEMENT METHOD PROGRAM

(75) Inventors: Shigeru Kashiwagi, Tokyo (JP); Haruo Yoshida, Kanagawa (JP); Masaharu Murakami, Tokyo (JP); Masayoshi Ohno, Tokyo (JP); Hiroshi Jinno, Kanagawa (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 10/573,476

(22) PCT Filed: Aug. 19, 2004

(86) PCT No.: PCT/JP2004/012234

§ 371 (c)(1),
(2), (4) Date: Mar. 24, 2006

(87) PCT Pub. No.: WO2005/033944

PCT Pub. Date: Apr. 14, 2005

(65) Prior Publication Data

US 2006/0288044 A1 Dec. 21, 2006

(30) Foreign Application Priority Data

Oct. 2, 2003 (JP) .............................. 2003-343951

(51) Int. Cl.
*G06F 7/00* (2006.01)
(52) U.S. Cl. ......................................... 707/2
(58) Field of Classification Search .................... 707/1, 707/2, 6, 7
See application file for complete search history.

(56) References Cited

U.S. PATENT DOCUMENTS

| 2002/0032696 A1* | 3/2002 | Takiguchi et al. ......... 707/500.1 |
| 2002/0048369 A1* | 4/2002 | Ginter et al. ................. 380/277 |
| 2003/0229637 A1* | 12/2003 | Baxter et al. .................... 707/9 |
| 2004/0177319 A1* | 9/2004 | Horn ........................ 715/501.1 |

FOREIGN PATENT DOCUMENTS

| JP | 2000-305829 | 11/2000 |
| JP | 2002-108677 | 4/2002 |
| JP | 2002-278996 | 9/2002 |

OTHER PUBLICATIONS

International Search Report mailed Sep. 28, 2004.
International Written Opinion mailed Sep. 28, 2004.

* cited by examiner

*Primary Examiner*—Charles Rones
*Assistant Examiner*—Fazlul Quader
(74) *Attorney, Agent, or Firm*—Rader, Fishman & Grauer PLLC; Christopher M. Tobin

(57) ABSTRACT

A file managing apparatus is disclosed which is capable of restoring deleted files with ease. When a user gives an instruction to delete a file 6, a parent entry number for the file 6 is changed from "1" to "2" in a property list having the entry number 6 associated with the file 6. Because the parent entry number that is set for the value "2" points to the entry of a recycle bin, the file 6 is placed in a virtually deleted state. Any virtually deleted file is later restored easily through simple processing.

12 Claims, 9 Drawing Sheets

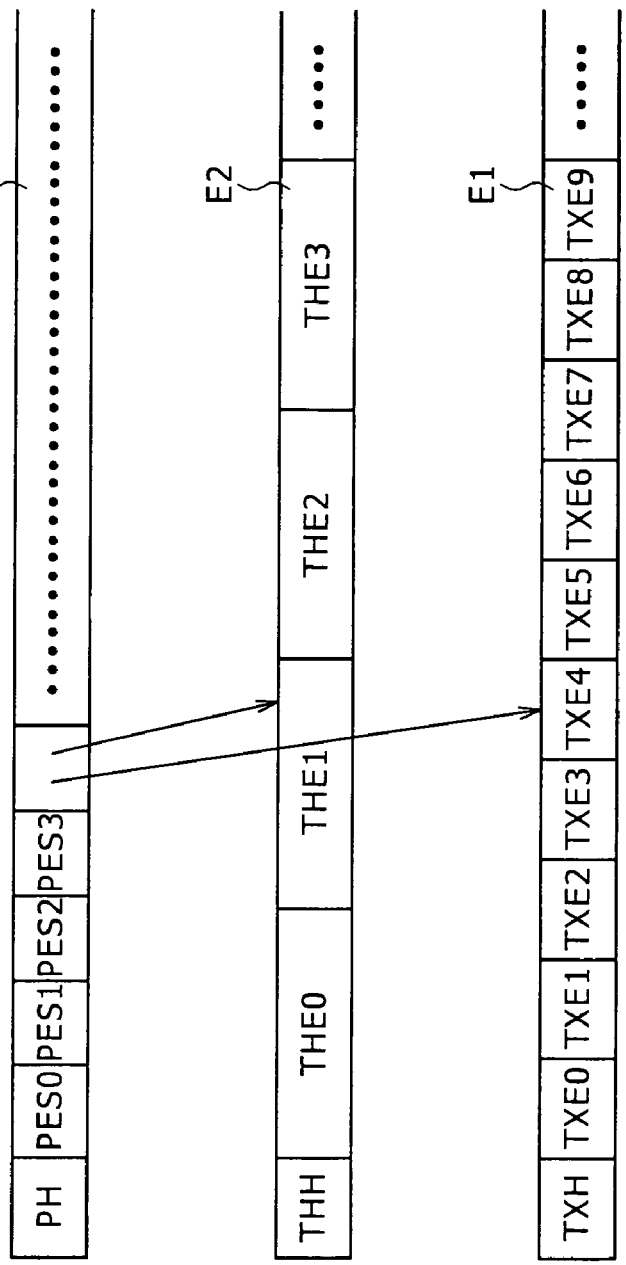

| Entry Number | 0 | 1 | 2 | 3 | 4 | 5 | 6 | 7 |
|---|---|---|---|---|---|---|---|---|
| Entry Property 0:Folder 1:File | 0 | 0 | 0 | 1 | 1 | 0 | 1 | 1 |
| Parent Entry Number | x | 0 | 0 | 0 | 1 | 1 | 1 | 5 |
| RECYCLE BIN 1:RECYCLE BIN 0:OTHERS | 0 | 0 | 1 | 0 | 0 | 0 | 0 | 0 |

| Entry Number | 0 | 1 | 2 | 3 | 4 | 5 | 6 | 7 |
|---|---|---|---|---|---|---|---|---|
| Entry Property 0:Folder 1:File | 0 | 0 | 0 | 1 | 1 | 0 | 1 | 1 |
| Parent Entry Number | x | 0 | 0 | 1 | 1 | 1 | 2 | 5 |
| RECYCLE BIN 1:RECYCLE BIN 0:OTHERS | 0 | 0 | 1 | 0 | 0 | 0 | 0 | 0 |

| Entry Number | 0 | 1 | 2 | 3 | 4 | 5 | 6 | 7 | 8 | 9 | 10 | 11 |
|---|---|---|---|---|---|---|---|---|---|---|---|---|
| Entry Property 0:Folder 1:File | 0 | 0 | 0 | 1 | 1 | 0 | 1 | 1 | 1 | 1 | 0 | 0 |
| Parent Entry Number | × | 0 | 0 | 0 | 0 | 1 | 10 | 11 | 1 | 5 | 2 | 2 |
| RECYCLE BIN 1:RECYCLE BIN 0:OTHERS | 0 | 0 | 1 | 0 | 0 | 0 | 0 | 0 | 0 | 0 | 0 | 0 |
| DELETE DATE | - | - | - | - | - | - | - | - | - | - | 8/15 | 8/16 |

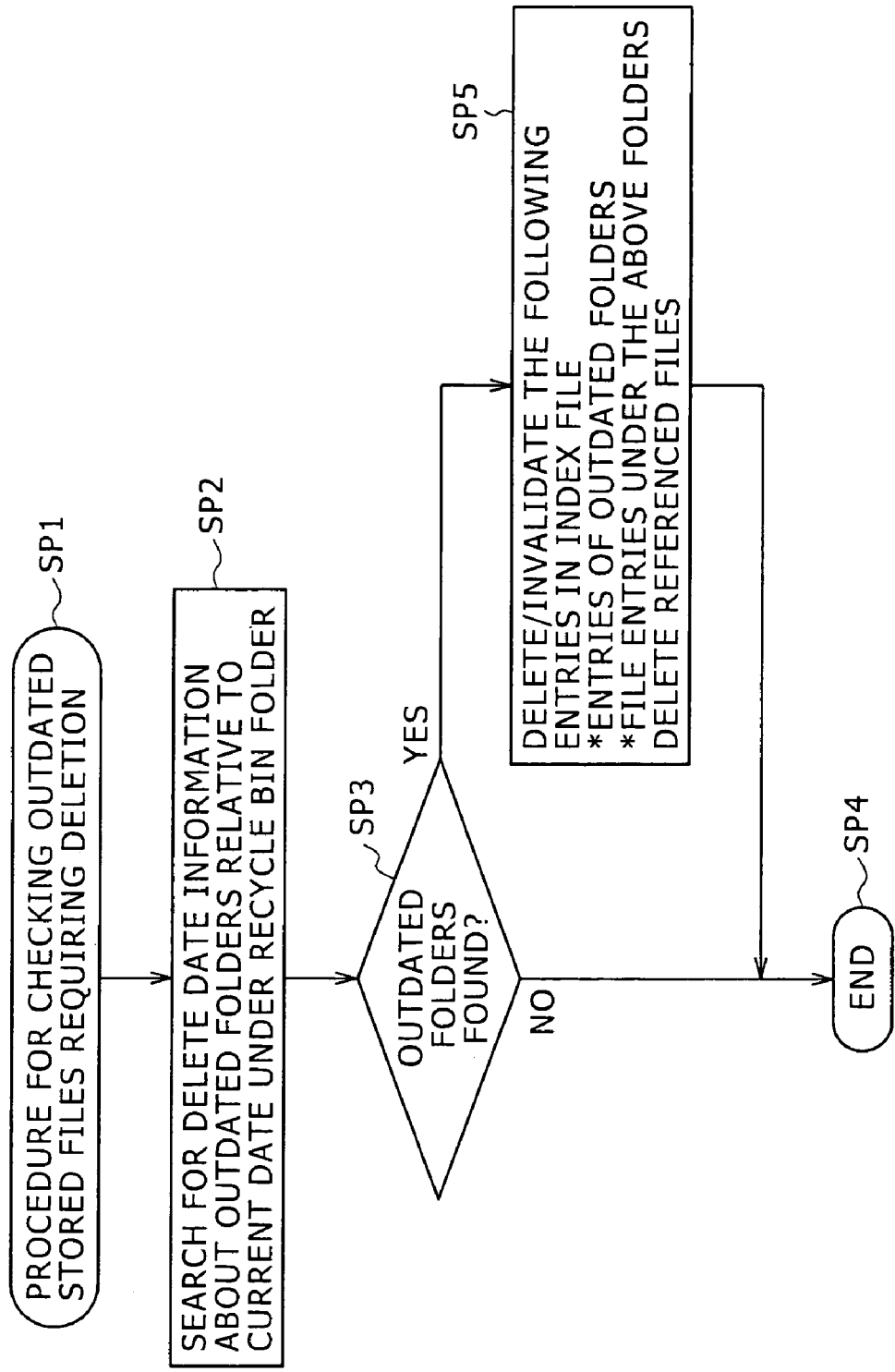

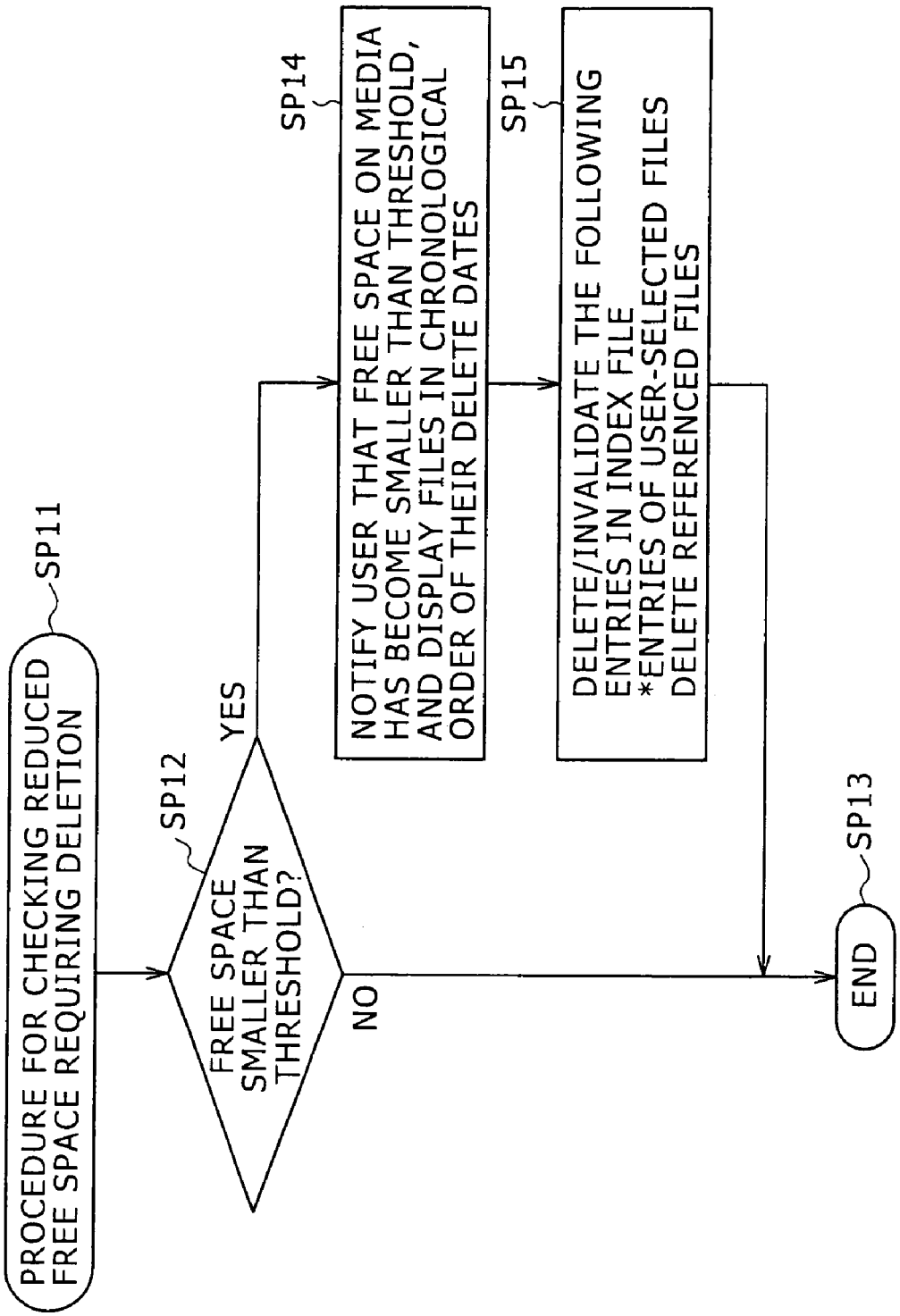

FILE MANAGEMENT DEVICE, FILE MANAGEMENT METHOD, FILE MANAGEMENT METHOD PROGRAM, AND RECORDING MEDIUM THE FILE MANAGEMENT METHOD PROGRAM

TECHNICAL FIELD

The present invention relates generally to a file managing apparatus, a file managing method, a file managing method program, and a recording medium that records the file managing method program; and more particularly to a video disk apparatus. According to the invention, management information which is associated with the entry of a given file designated to be deleted and which points to another entry is changed so as to point to a temporary management entry for the file in question, whereby the files deleted earlier by manipulation of an index file are restored easily.

BACKGROUND ART

In recent years, disk apparatuses for recording taken pictures have been proposed for implementation by the use of a mass recording medium such as optical disks permitting random access.

In connection with such disk apparatuses, Japanese Patent Laid-open No. 2001-84705 proposes illustratively a method for creating an index file that indexes many files recorded on a recording medium, the created index file being recorded to the medium for use in handling the numerous files more easily.

Japanese Patent Laid-open No. 2002-278996 proposes a method for arranging files into a hierarchical structure using an index file created to index and record the files, whereby the numerous files may be handled even more easily than before.

Where the object to be managed by the index file proposed by the above patent documents is video content, a thumbnail is created from each of the files being managed. A series of entries representing the thumbnails are turned into a thumbnail entry file. A series of entries corresponding to those in the thumbnail entry file are made into a property entry file. Information for managing the thumbnail entry file and information for identifying the corresponding files being managed are recorded to the property entry file. Where the files being managed are files of video content, the index file allows the thumbnails recorded in the thumbnail entry file to be displayed so that the user may be presented with numerous items of video content recorded on the recording medium. Furthermore, what is recorded in the property entry file enables the user to acquire the video content represented by the thumbnail selected by the user from the video content presentations.

Conceivably, if the selection of files through the index file is utilized in deleting files as well, it will be possible to select any file desired to be deleted with ease and reliability, whereby the user's ease of operation in connection with the file-deleting chore will be improved. In this case, a desired file may be selected by resorting to an index file and deleted by a file management system handling the recording medium, followed by the deletion of the entry of the file in question from the index file.

Meanwhile, it might happen that the user later wants to restore some of the deleted files. However, it is not possible to restore the files deleted by the use of the index file.

One way to solve the above problem is by deleting only from the index file the entry of the file of interest while leaving the file itself intact on the recording medium. In this case, making another entry of the file recorded on the recording medium in the index file should enable the deleted file to be restored. This method, however, has the disadvantage of being incapable of detecting the file of interest from the index file because the index file no longer has the entry of that file. The difficulty in detecting desired files to be restored through the index file often results in the difficulty in restoring any deleted files in many cases.

DISCLOSURE OF INVENTION

The present invention has been made in view of the above circumstances and provides a file managing apparatus, a file managing-method, a file managing method program, and a recording medium that records the file managing method program for allowing deleted files to be restored easily through manipulations of an index file.

According to one embodiment of the present invention, there is provided a file managing apparatus for managing files recorded on a recording medium by resorting to an index file recorded on the recording medium; wherein the index file is formed by a series of entries constituted by blocks of extract information about the files, the extract information being arranged to correspond with the files; wherein management information which is set for each of the entries and which primarily points to another entry is provided to express a hierarchical structure of the files recorded on the recording medium; and wherein an entry for temporary management is provided under which a file to be deleted is stored temporarily; the file managing apparatus changing the management information which is set for the entry of the file to be deleted and which primarily points to another entry, in such a manner that the management information points to the entry for temporary management.

In the structure outlined above, the file managing apparatus according to the present invention manages files recorded on the recording medium by resorting to the index file recorded on the same recording medium. Given an instruction to delete a file, the file managing apparatus changes the management information which is set for the entry of the file in question and which primarily points to another entry, in such a manner that the management information points to the entry for temporary management. That is the file of interest whose entry was placed under a particular folder is placed anew under the entry for temporary management. When all files to be deleted are placed collectively under the entry specifically reserved for temporary management, simply changing the management information pointing to that entry allows a desired file to be restored. In this manner, any deleted file can be restored easily by manipulating the index file.

According to another embodiment of the present invention, there is provided a file managing method for managing files-recorded on a recording medium by resorting to an index file recorded on the recording medium; wherein the index file is formed by a series of entries constituted by blocks of extract information about the files, the extract information being arranged to correspond with the files; wherein management information which is set for each of the entries and which primarily points to another entry is provided to express a hierarchical structure of the files recorded on the recording medium; and wherein an entry for temporary management is provided under which a file to be deleted is stored temporarily; the file managing method including the step of changing the management information which is set for the entry of the file to be deleted and which primarily points to another entry, in such a manner that the management information points to the entry for temporary management.

Where the file managing method of the present invention is in use, any deleted file can also be restored easily by manipulating the index file.

According to a further embodiment of the present invention, there is provided a file managing method program for causing a computer to carry out a procedure for managing files recorded on a recording medium by resorting to an index file recorded on the recording medium; wherein the index file is formed by a series of entries constituted by blocks of extract information about the files, the extract information being arranged to correspond with the files; wherein management information which is set for each of the entries and which primarily points to another entry is provided to express a hierarchical structure of the files recorded on the recording medium; and wherein an entry for temporary management is provided under which a file to be deleted is stored temporarily; the procedure including the step of changing the management information which is set for the entry of the file to be deleted and which primarily points to another entry, in such a manner that the management information points to the entry for temporary management.

Where the file managing method program of the present invention is in use, any deleted file can also be restored easily by manipulating the index file.

According to an even further embodiment of the present invention, there is provided a recording medium which records a file managing method program for causing a computer to carry out a procedure for managing files recorded on a recording medium by resorting to an index file recorded on the recording medium; wherein the index file is formed by a series of entries constituted by blocks of extract information about the files, the extract information being arranged to correspond with the files; wherein management information which is set for each of the entries and which primarily points to another entry is provided to express a hierarchical structure of the files recorded on the recording medium; and wherein an entry for temporary management is provided under which a file to be deleted is stored temporarily; the procedure including the step of changing the management information which is set for the entry of the file to be deleted and which primarily points to another entry, in such a manner that the management information points to the entry for temporary management.

Through the use of the recording medium which records the file managing method program of the present invention, any deleted file can also be restored easily by manipulating the index file.

According to the present invention, as outlined above, simple manipulations of the index file permit restoration of deleted files with ease.

BRIEF DESCRIPTION OF DRAWINGS

FIGS. 2A, 2B and 2C are schematic views showing relations between entry files in an index file;

FIG. 7 is a flowchart of steps constituting a procedure performed by a system control microcomputer 19 of the optical disk apparatus practiced as the second embodiment;

FIG. 8 is a flowchart of steps constituting a procedure carried out by a system control microcomputer 19 of an optical disk apparatus practiced as a third embodiment of the present invention.

BEST MODE FOR CARRYING OUT THE INVENTION

Preferred embodiments of the present invention will now be described with reference to the accompanying drawings.

Figure 1:
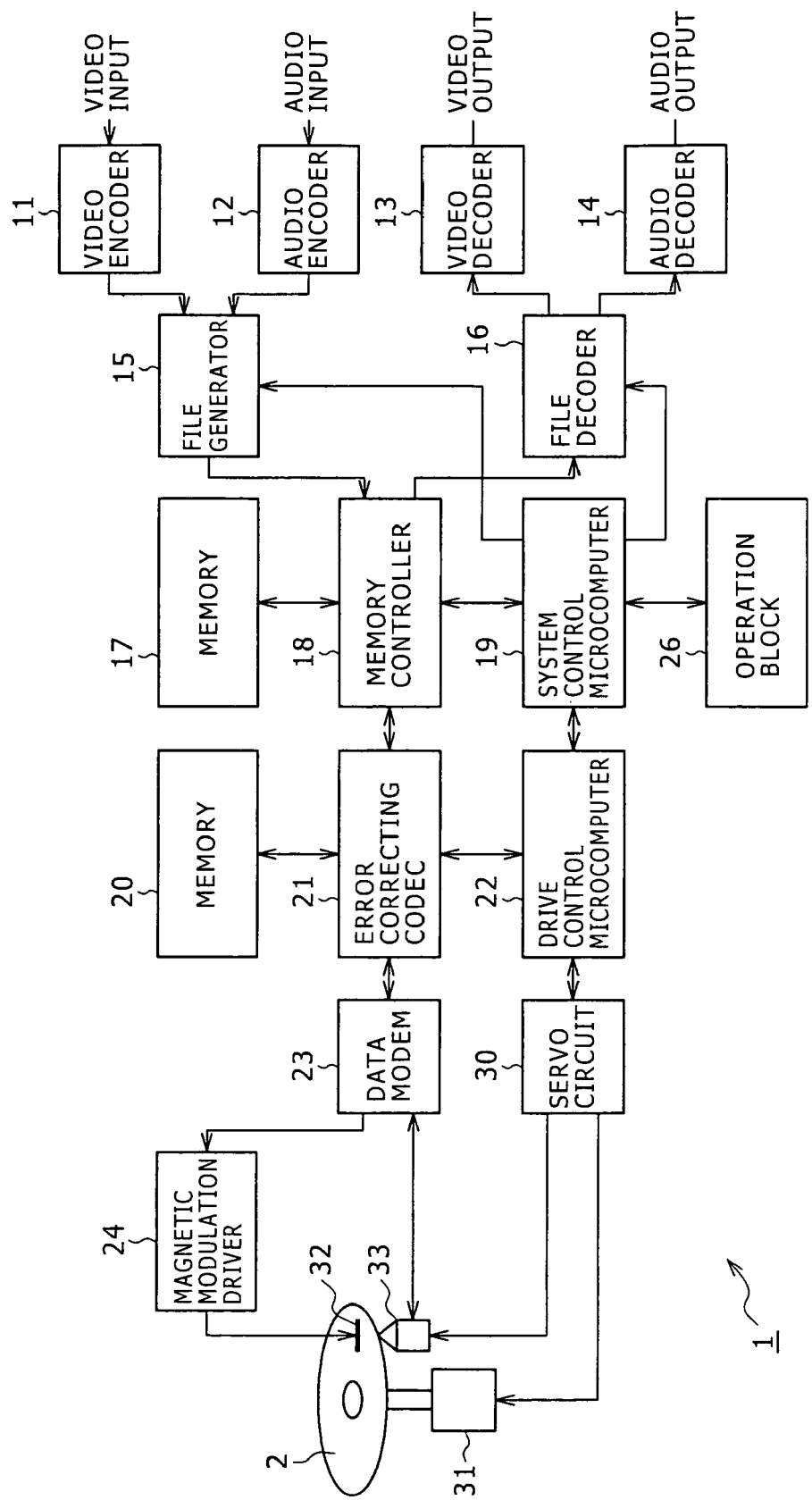
FIG. 1 is a block diagram of an optical disk apparatus practiced as a first embodiment of the present invention.

(1) Structure of the First Embodiment (1-1) Structure of the Optical Disk Apparatus FIG. 1 is a block diagram of an optical disk apparatus practiced as the first embodiment of the present invention. The optical disk apparatus 1 acquires a video and an audio signal of a subject using a video and an audio pickup unit, not shown, and records to an optical disk 2 the video and audio signals representing the pictures taken of the subject. For reproduction, the optical disk apparatus 1 retrieves the pictures taken from the optical disk 2, and outputs the reproduced video and audio to a display unit (liquid crystal display) and an audio output unit (speakers) or to an external device. The video and audio signals representative of the pictures taken are converted by the optical disk apparatus 1 to streaming data in MPEG (Moving Picture Experts Group) format and further to a suitable file format ready for recording to the optical disk 2. The file format adopted by the first embodiment is Quick Time (called QT hereunder).

In the optical disk apparatus 1, a video encoder 11 generates video data by converting the video signal of the pictures taken from analog to digital format, and encodes the resulting digital video data in MPEG format so as to output an elementary stream of the video data.

An audio encoder 12 generates audio data by converting the audio signal of the pictures taken from analog to digital format, and encodes the resulting digital audio data in MPEG format so as to output an elementary stream of the audio data.

Upon recording, a file generator 15 multiplexes the elementary streams coming from the video encoder 11 and audio encoder 12. Through the multiplexing, the file generator 15 creates a QT movie file under control of a system control microcomputer 19.

A memory controller 18 switches its operation under control of the system control microcomputer 19. Upon recording, the memory controller 18 writes consecutively a data sequence of the QT movie file coming from the file generator 15 as well as various data from the system control microcomputer 19 to a memory 17 for temporary storage, and outputs retained data to an error-correcting codec 21 to provide for subsequent processing. Upon reproduction, by contrast, the memory controller 18 temporarily retains data coming from the error-correcting codec 21, and outputs the data to a file decoder 16 and the system control microcomputer 19.

The error-correcting codec 21 switches its operation under control of the system control microcomputer 19. Upon recording, the error-correcting codec 21 writes data coming from the memory controller 18 to a memory 20 for temporary storage and adds error-correcting code to the data. The data thus retained in the memory 20 is retrieved in a predetermined sequence for output. The output data is interleaved before being forwarded to a data modem 23. Upon reproduction, in contrast to the recording process, the error-correcting codec 21 writes data coming from the data modem 23 to the memory 20 for temporary storage in a predetermined sequence, before outputting the data to the memory controller 18. The data output from the data modem 23 is thus interleaved for output. At this point, the interleaved output data is subjected to error correction based on the same error-correcting code as that used upon writing.

The data modem 23 switches its operation under control of the system control microcomputer 19. Upon recording, the data modem 23 converts data coming from the error-correcting codec 21 into a sequence of serial data, modulates the converted data, and outputs the modulated data to a magnetic modulation driver 24 or to an optical pickup 33. Upon reproduction, the data modem 23 retrieves a clock signal from a reproduced signal being output by the optical pickup 33. The data modem 23 subjects the reproduced signal to binarization and demodulation in reference to the retrieved clock signal. This process provides reproduced data corresponding to the serial data sequence generated upon recording. The reproduced data is sent from the data modem 23 to the error-correcting codec 21.

Where the optical disk 2 is a magneto-optical disk, the magnetic modulation driver 24 under control of the system control microcomputer 19 drives a magnetic head 32 using the data output from the data modem 23. The magnetic head 32 is positioned in symmetrically opposed relation to the optical pickup 33 across the optical disk 2. In this setup, a magnetic field so modulated as to reflect the output data from the data modem 23 is applied to a laser beam-irradiated spot under the optical pickup 33. In this manner, where the optical disk 2 is a magneto-optical disk, the optical disk apparatus 1 allows QT movie files or other data to be recorded to the optical disk 2 by using the thermomagnetic recording method.

The optical disk 2 is a disk-type recording medium. With the first embodiment, the optical disk 2 is a rewritable optical disk such as the Magneto-Optical Disk (MO) or a phase change type disk. A spindle motor 31 drives rotatively the optical disk 2 at Constant Linear Velocity (CLV), at Constant Angular Velocity (CAV), or at Zone Constant Linear Velocity (ZCLV) as designated under control of a servo circuit 30.

The servo circuit 30 controls the spindle motor 31 in operation on the basis of various signals output from the optical pickup 33, whereby spindle control is carried out. Likewise the servo circuit 30 subjects the optical pickup 33 to tracking and focus control based on the signals output from the optical pickup 33. Furthermore, the servo control 30 causes the optical pickup 33 and magnetic head 32 to carry out seek and focus search operations.

A drive control microcomputer 22 under instructions from the system control microcomputer 19 controls the servo circuit 30 in seek and other operations.

The optical pickup 33 applies a laser beam to the optical disk 2, receives the reflection using a light-receiving element, and processes the received reflection so as to generate various control signals. The optical pickup 33 also outputs reproduced signals whose levels vary in accordance with the pit and mark sequences formed on the optical disk 2. Furthermore, the optical pickup 33 switches its operation under control of the system control microcomputer 19 and, if the optical disk 2 is a magneto-optical disk, raises intermittently the intensity of the laser beam applied to the optical disk 2 upon recording. This allows the optical disk apparatus 1 to record QT movie files or other data to the optical disk 2 using the so-called pulse train method. Where the optical disk 2 is a phase change type disk, the optical pickup 33 raises the intensity of the laser beam applied to the optical disk 2 from the intensity for reproduction up to the intensity for recording in accordance with the data output from the data modem 23. In this manner, QT movie files and other data are recorded to the optical disk 2 by use of the electrothermal recording method.

As described, the optical disk apparatus 1 first uses the video encoder 11 and audio encoder 12 to compress the video and audio signals representing the pictures taken for conversion into elementary streams. Then the file generator 15 is used to convert the elementary streams into a QT movie file that is subjected to the processing by the memory controller 18, error-correcting codec 21 and data modem 23, in that order. After the processing, the QT move file data and index file data and the like are written to the optical disk 2 by either the optical pickup 33 alone or by the optical pickup 33 and magnetic head 32 in combination. The index file is a file for indexing purposes under which the QT movie file is placed for management purposes, the movie file being recorded on the optical disk 2.

The optical disk apparatus 1 causes the optical pickup 33 to acquire a reproduced signal from the optical disk 2, has the data modem 23 process the acquired signal into reproduced data, and gets the error-correcting codec 21 to process the reproduced data illustratively into a QT movie file and an index file. These are the files recorded on the optical disk 2. The reproduced QT movie file, index file and other data are output from the memory controller 18.

The file decoder 16 inputs the QT movie file data from the memory controller 18 and separates the input data into elementary streams of video and audio data for output. The video decoder 13 decompresses the elementary stream of the video data, and outputs the decompressed data to the display unit and external device, not shown. The audio decoder 14 decompresses the elementary stream of the audio data coming from the file decoder 16, and outputs the decompressed data to the audio output unit and external device, not shown. In this manner, the optical disk apparatus 1 allows the user to monitor the taken pictures reproduced from the optical disk 2.

The optical disk apparatus 1 has an interface connectable to external devices such as a computer. Through the interface, data output from the computer, not pictures taken, may be written to the optical disk 2. Conversely, files recorded on the optical disk 2 may be reproduced from there and output to the computer through the interface.

An operation block 26 is constituted by the controls for operating the optical disk apparatus 1 and by a touch panel mounted on a liquid crystal display panel. Operations performed by the user on any of the controls and the touch panel are signaled to the system control microcomputer 19.

The system control microcomputer 19 is a microcomputer that controls overall performance of the optical disk apparatus 1. A procedure held in a memory, not shown, is carried out by the system control microcomputer 19 to detect an optical disk 2 that may be loaded. Upon detection of the disk, the system control microcomputer 19 causes the optical pickup 33 to seek the radially innermost zone on the optical disk 2 to reproduce management information from there for use by a file management system regarding the optical disk 2. The system control microcomputer 19 acquires the reproduced management information from the memory controller 18 and stores it into an internal memory. The management information allows the system control microcomputer 19 to detect the addresses of the files recorded on the optical disk 2 as well as free spaces on the optical disk 2.

The programs used by the system control microcomputer 19 for its processing are offered preinstalled. Alternatively, the programs may be installed after being downloaded over a network or reproduced from suitable storage media. Such storage media may include optical disks, magnetic tapes, memory cards and other appropriate types of storage media.

A search done by the system control microcomputer 19 through the management information thus acquired may reveal the presence of an index file on the optical disk 2. If that happens, the system control microcomputer 19 causes the optical pickup 33 to seek the disk location where the index file is recorded and reproduce the index file from that location. The system control microcomputer 19 acquires the reproduced index file via the memory controller 18 and records it to the internal memory for storage. The index file enables the first embodiment of the invention to improve the overall ease of operation on the files recorded on the optical disk 2. If the index file is recorded in the radially innermost zone of the user area on the disk, the time required to seek that file and start up the processing can be shortened.

In response to the user's operations, the system control microcomputer 19 references the index file and accordingly causes thumbnail images or other indications to appear on the liquid crystal display panel for monitoring purposes. The thumbnails introduce to the user what is contained in each QT movie file recorded on the optical disk 2. Following the introduction, the system control microcomputer 19 accepts the selection of a file by the user. The selected file is reproduced by the system control microcomputer 19 controlling overall system performance in keeping with corresponding management information.

If the user gives an instruction to record pictures taken, the system control microcomputer 19 causes the optical pickup 33 to detect a free space based on the management information and seek that space to record on the optical disk 2 the pictures taken successively. When the QT movie file records are changed as a result of the recording of the pictures taken, the management information held in the memory is updated accordingly. When the optical disk 2 is about to be unloaded, the management information on the optical disk 2 is updated in a manner reflecting the updated management information in the memory. More specifically, the management information on the optical disk 2 is updated by having the updated management information in the memory transferred to the error-correcting codec 21 by way of the memory controller 18.

In the above processing, the system control microcomputer 19 outputs to the file generator 15 diverse kinds of information necessary for generating the QT movie file to be recorded. The system control microcomputer 19 also acquires through the file generator 15 the information needed to create an index file and, using the information thus acquired and information output to the file generator 15, updates the index file stored in the memory concerning the QT movie file to be recorded anew to the optical disk 2. As in the updating of management information, the index file held in the memory is referenced so that the index file recorded on the optical disk 2 is updated correspondingly.

When the user gives an instruction to edit a file recorded on the optical disk 2, the index file and management information held in the memory are updated in keeping with the editing of the designated file in the same manner as upon recording. The updated index file and management information in the memory are referenced so that the index file and management information recorded on the optical disk 2 are updated correspondingly.

The optical disk apparatus 1, which records the video and audio signals representing the pictures taken to the optical disk 2, writes QT movie files to the optical disk 2 in an external reference format. More specifically, the optical disk apparatus 1 records a video file and an audio file made up respectively of the video and audio signals to the optical disk 2. The optical disk apparatus 1 also records to the optical disk 2 a resource file for managing the video and audio files. A QT movie file composed of the video file, audio file, and resource file is then recorded to the optical disk 2.

(1-2) Index File

As in the case of the files such as QT movie files recorded on the optical disk 2, the file management system for the optical disk 2 manages an index file having such information as recording location addresses, file names, and file lengths necessary for reproduction. The index file is constituted primarily by information for introducing the content of the QT movie files subject to management, the files being recorded on the optical disk 2. Using the index file, the optical disk apparatus 1 selects the designated QT movie file from the optical disk 2 and reproduces the selected file from the disk 2 based on the file management system. In this manner, a desired file may be selected and reproduced quickly and accurately from among numerous QT movie files that may be recorded on the optical disk 2. This feature contributes to improving the user's ease of operation.

With the first embodiment, the information for introducing the content of QT movie files is assigned extract information about these QT movie files, and the resulting body of information is turned into blocks. The index file is formed by a series of entries constituted by these blocks of extract information. The entries allow the content of each QT movie file to be grasped easily and quickly.

In the index file, the items of data represented by the extract information are classified by attribute into groups. The index file has the same file structure as that of QT movie files recorded on the optical disk 2. That means the index file can be created and processed by use of the unchanged structure of the optical disk apparatus 1 creating QT movie files. The absence of the need for a new structure signifies an uncomplicated constitution of the optical disk apparatus 1.

More specifically, as shown in FIGS. 2A through 2C, the extract information denoting actual data is classified into groups and assigned to a text entry file E1, a thumbnail entry file E2, and a property entry file E3. The entry files E1 through E3, together with a resource file (not shown) having management information about these files E1 through E3, to make up the index file in accordance with the structure of the QT movie files.

The entry files E1, E2 and E3 are prefixed respectively with headers TXH, THH, and PH representative of the attributes of the files E1, E2 and E3. Each of the headers is followed by a series of entries in slots having a fixed length each.

The text entry file E1 is formed by a series of entries of title data placed successively in slots, the data representing a sequence of title text indicating a disk title and titles of the files subject to management. The thumbnail entry file E2, on the other hand, is formed by a series of entries of thumbnails placed successively in slots, the thumbnails being still pictures indicating the disk title and the content of each of the files subject to management.

The text entry file E1 and thumbnail entry file E2 have each of their slots formed in a fixed length. One or a plurality of slots are assigned to each file to be managed depending on the amount of the data making up the corresponding extract information obtained from the file in question. Because the type of extract information varies from one file to another, it might happen that no entry is assigned to some files subject to management.

Meanwhile, the property entry file E3 is formed by a series of entries of extract information placed successively in slots together with entry management information, the extract information being made up of binary data representing the disk title and the attributes of each of the files subject to management. As with the text entry file E1 and thumbnail entry file E2, the property entry file E3 has each of its slots formed in a fixed length. The property entry file E3 is always provided regardless of the different types of the files subject to management. The entries of the files being managed are established in correspondence with the entries furnished in the text entry file E1 and thumbnail entry file E2.

Where no corresponding entry is provided for a given file in the text entry file E1 or thumbnail entry file E2, one or a plurality of slots are assigned to that file in the property entry file E3 depending on the amount of the data making up the corresponding extract information about the file in question. If a plurality of entries are furnished regarding a given file being managed in the text entry file E1 or thumbnail entry file E2, at least these multiple entries are provided for the file in question regardless of the amount of the data making up the extract information. When actual data parts are each formed by a fixed length in the index file, any wasteful use of the recording medium is minimized and the number of access operations to the recording medium is reduced so as to shorten the time required for processing.

The property entry file E3 has management information indicating relations of each entry to another entry (as shown by arrows in FIGS. 2A through 2C), the information designating the entry of the other corresponding entry file. If an entry has a plurality of slots, then management information is provided for extension slots designating the ensuing entries. In this setup, the index file designates a plurality of slots in which is recorded the extract information about a single file subject to management through the use of the management information denoting relations to another entry established in the property entry file E3. The property entry file E3 includes information for designating corresponding files subject to management. This makes it possible to designate a desired file by use of the extract information recorded in the index file.

The property entry file E3 is also provided with management information indicating whether the extract information set for each entry is valid or invalid. In the index file, only the valid/invalid setting information about each property entry may be used to invalidate collectively the corresponding entries in the other entry files E1 and E2, and the property entry file E3, whereby any desired file subject to management is deleted from the index file.

The index file makes it possible to store into the entry files not only the files actually present on the recording medium but also real as well as virtual folders recognized by the file management system for the recording medium. For each property entry, there is defined a hierarchical structure of the property entries having these folders set thereto. That is, a real hierarchical structure of the folders set on the optical disk 2 and a virtual hierarchical structure of the folders established in the index file are used to manage the files recorded on the optical disk 2.

In the resource file, the management information such as the slot starting location for each entry file is recorded together with the attribute information in the index file.

With the above arrangements in effect, the index file presents the user with thumbnails from the thumbnail entry file E2 or with file titles from the text entry file E1. In so doing, the index file accepts the user's selection of a file based on these thumbnails and titles. The selected file is detected by the file management system searching the property entries for the file name, whereby the user's ease of operation is improved.

In the optical disk apparatus 1, the system control microcomputer 19 acquires compressed video and audio data through the file generator 15, decodes the acquired data, generates thumbnails out of the video data through pixel skipping, and turns the thumbnails into the thumbnail entry file E2. The system control microcomputer 19 also creates the text entry file E1 by generating title data either from the user's settings or from the file information about the files which are subject to management and which are retained by the file management system for the optical disk 2. Furthermore, the system control microcomputer 19 creates the property entry file E3 in response to the user's operations. The resource file is then generated on the basis of the entry files E1 through E3 created as described.

(1-3) Management by Property Entry

Figure 3A:
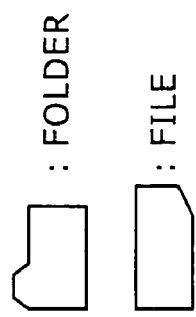
FIGS. 3A and 3B are a tabular and a schematic view, respectively, showing how property entries are made.
Figure 3B:
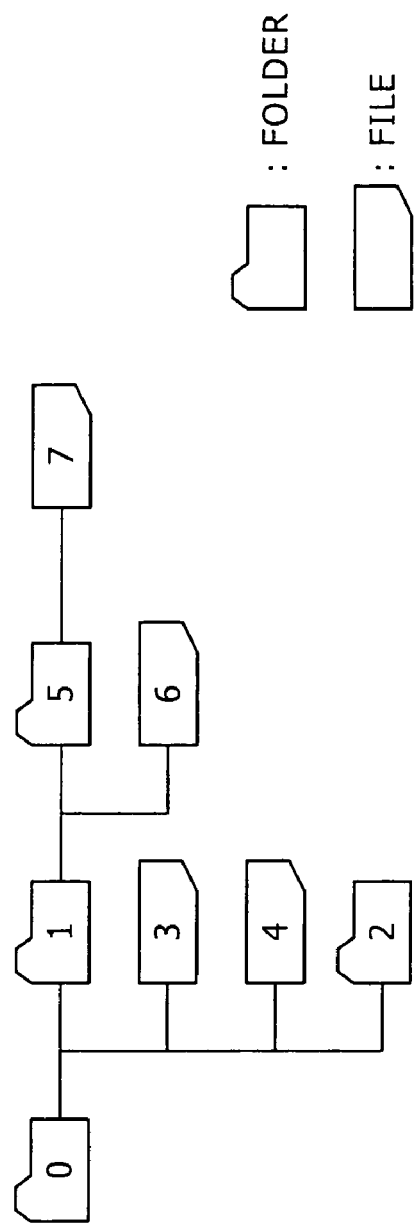

FIGS. 3A and 3B illustrate how property entries of files are made. In these two figures and other similar figures, only property entries are shown for purpose of simplification and illustration except for extension slots. Each folder and file is shown together with the slot number of the corresponding slot. If the slot of a given property entry has any extension slot corresponding to another entry, slot-related processing regarding property entries, to be described below, is carried out on these related slots that are handled collectively.

In the property entry file E3, entry numbers (Entry Number) each designating a single slot are established. Also in the property entry file E3, Property Entry Flags (entry properties) each denoting a set of flags are established. Each property entry flag (Entry Property) carries diverse kinds of information representing the attribute of each entry. One such attribute represented by entry property flag is defined by a flag specifying whether the entry corresponds to a folder (0: Folder) or to a file (1: File).

In the examples of FIGS. 3A and 3B, a root folder 0 that actually exist under the file management system for the optical disk 2 is assigned the property entry with entry number 0. This property entry indicates a folder since the property entry flag is set to 0. Folders 1 and 2 and files 3 and 4 immediately below the root folder are assigned the property entries with entry numbers 1, 2, 3 and 4, respectively. Each of the property entry flags is set to 0 or to 1 indicating a folder or a file. Folders 5 and 6 immediately below the folder 1 are assigned the property entries with entry numbers 5 and 6 respectively. Each of the property entry flags is set to 0 or to 1 indicating a folder or a file. A file 7 belonging to the folder 5 is assigned the property entry with entry number 7, with the property entry flag set to 1 indicating a file.

With regard to each of the entry settings corresponding to the folders and files, the property entry file E3 has management information which indicates relations to another entry and which is made up of a parent entry number (Parent Entry Number) pointing to the slot corresponding to the closest folder that each file or folder belongs to. In the examples of FIGS. 3A and 3B, the parent entry number (Parent Entry Number) is set to 0 for the entries with entry numbers 1 through 4. The folders 1 and 2 and the files 3 and 4 corresponding to the entry numbers 1 through 4 are thus shown belonging to the root folder. The parent entry number (Parent Entry Number) is set to 1 for the entries with entry numbers 5 and 6, and the parent entry number is set to 5 for the entry with entry number 7. These numbers indicate that the folder 5, file 6, and file 7 belong to the folder 1, folder 1, and folder 5 respectively.

The property entry file E3 is also arranged to have child entry numbers pointing to files and entries in descending order, in contrast to the parent entry numbers. The child entry numbers permit easy searches for files belonging to a particular folder. In this case, the entry with entry number 0 is assigned child entry numbers 1, 2, 3 and 4 pointing the entries of the folders 1 and 2 and the files 3 and 4, respectively. The entry with entry number 1 is assigned child entry numbers 5 and 6 pointing the entries of the folder 5 and file 6. The entry with entry number 5 is assigned child entry number 7.

In above setup, the index file permits the managing of files using an actual hierarchical structure that exists under the file management system as well as a virtual hierarchical structure. In the description that follows, the information pointing to other entries in defining such hierarchical structures is referred to as hierarchical information.

As another property entry flag, the property entry file E3 has a flag pointing to the recycle bin (called the recycle bin flag hereunder). In the example of FIG. 3A, the recycle bin flag is set to 1 (valid) for the property entry with entry number 2. The recycle bin flag is a flag that symbolizes a virtual trash can, so that the recycle bin entry is an entry under which files and folders designated to be deleted are stored temporarily. Like the entries related to folders, the recycle bin entry is illustratively assigned property entries. Thus in the index file, a virtual folder of the recycle bin is provided.

As a further property entry flag, the property entry file E3 has a valid/invalid flag representative of valid/invalid information indicating whether the information on a given entry is valid or invalid. In the index file, switching the valid/invalid flag of an entry from valid (Valid) to invalid (Invalid) turns the slot for that entry into a free slot. Such free slots may be reused for the storage of entries. If the valid/invalid flag of an entry is set to invalid, the information on that entry indicating relations to the other entry files E1 and E2 is still retained. As a result, the corresponding slots in the entry files E1 and E2 are established as free slots while maintaining their relations to the property entry file E3. When files are to be stored again into the property entry file E3, there is no need to establish their relations anew to the entry files E1 and E2. This simplifies the process of storing files again.

(1-4) Deletion of Files by Use of the Index File

Following the picture-taking process, as described above, the system control microcomputer 19 sets an entry representative of the pictures taken to a free slot in the property entry file E3 by establishing a parent entry number, a child entry number, and a valid/invalid flag in such a manner that the pictures taken belong to a user-designated folder or a predetermined folder. The file of the pictures taken is thus stored into the index file. If the user designates during editing a different folder into which to store the pictures taken, the system control microcomputer 19 changes accordingly the parent and child entry numbers of the corresponding property entry.

By contrast, if the user gives an instruction to delete a file, the system control microcomputer 19 places the file in question into a virtually deleted state by suitably setting the management information indicating relations of the file to another entry. If the user gives an instruction permanently to delete the virtually deleted file, the system control microcomputer 19 actually deletes the file from the optical disk 2 and erases the entry regarding that file. In the description that follows, the permanently deleted state of the file is clearly distinguished from its virtually deleted state.

Suppose that the user gives an instruction to delete a file selected from a catalog of files subject to management based on the index file, the catalog indicating the files by thumbnails and titles. In that case, the system control microcomputer 19 detects the entry corresponding to that file in the property entry file E3. When the entry is detected, the system control microcomputer 19 updates the parent entry number of the entry so that the number points to the recycle bin entry. With the parent entry number updated, the system control microcomputer 19 adds the entry number of the file in question to the child entry number that is set for the parent entry number.

Figures 4A, 4B:
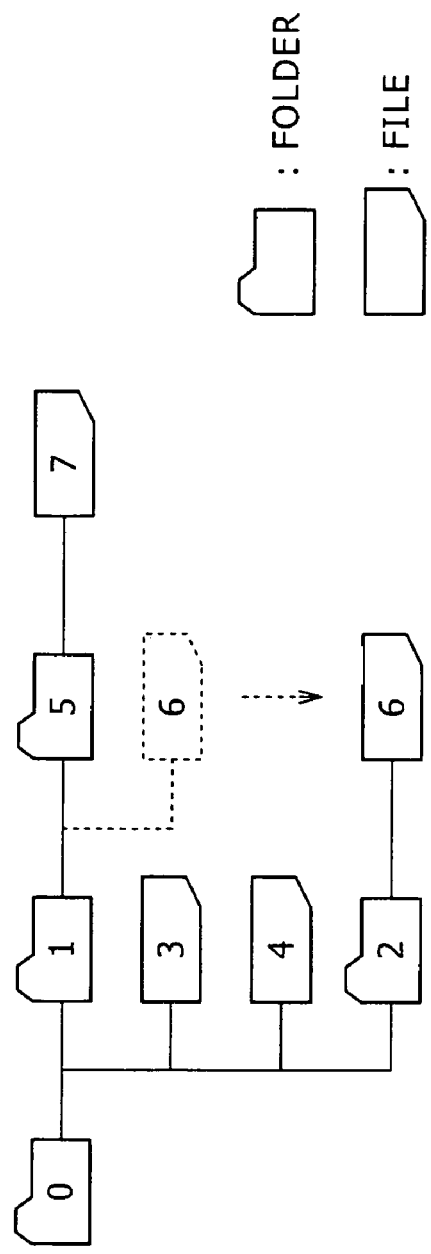
FIGS. 4A and 4B are a tabular and a schematic view, respectively, showing how a file is deleted in contrast to the arrangements in FIGS. 3A and 3B.

As shown in FIGS. 4A and 4B in contrast to FIGS. 3A and 3B, if the user gives an instruction to delete a file 6, the system control microcomputer 19, referencing the property entry with entry number 6 for the file 6, changes the parent entry number of the entry to 2 pointing to the recycle bin entry. To the recycle bin entry, entry number 6 is added as a child entry number.

As described, the system control microcomputer 19 regarding a given file placed hierarchically under the recycle bin folder in the index file system holds the valid/invalid flag of that file to the valid setting in the property entry file E3. Thus each entry placed in the virtually deleted state is arranged not to be assigned a free slot for a predetermined period of time; the slot associated with each virtually deleted entry is not used for renewed storage.

Arrangements are also made not to change the information indicating relations to other entries or modify the other entry files. These arrangements make it possible to display the files placed in the virtually deleted state by the user as part of the catalog of thumbnails and titles representing the other files stored in the index file. This allows the user to restore or to delete permanently any of the virtually deleted files with ease and reliability. If the user gives an instruction to restore a virtually deleted file, that file is restored through a simple process involving the changing of the parent entry number of the entry associated with the file in question as well as the child entry number of the entry assigned to the recycle bin.

Figure 5:
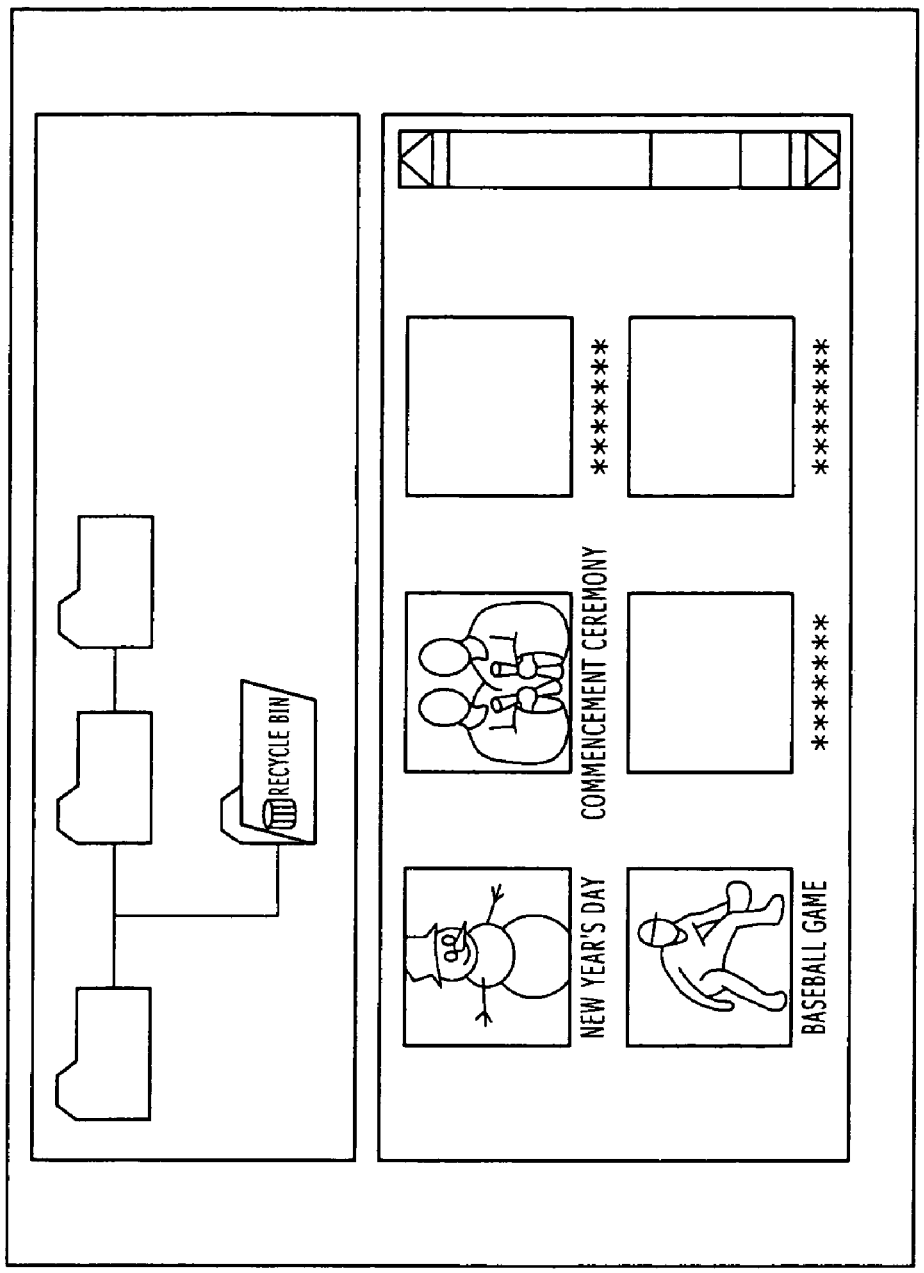
FIG. 5 is a schematic view of a typical display showing entries in a recycle bin.

In response to the user's operations, the system control microcomputer 19 references the property entry file E3 as shown in FIG. 5; detects the entries associated with the folders stored in the property entry file; analyzes the hierarchical structure of the folders established in the index file, using the child entry numbers set on the detected entries; and displays the structure of the folders by icons based on the result of the analysis. At this point, the system control microcomputer 19 displays the entry of the recycle bin in the form of a folder carrying the folder name set on the recycle bin symbol.

Depending on the user's settings, the system control microcomputer 19 may display the folder structure on the upper half of the display screen and a catalog of the files belonging to the user-selected folder on the lower part of the screen. At this point, the system control microcomputer 19 may create a file catalog made up of thumbnails and titles in keeping with the user's choice.

If the user gives an instruction to display a list of files belonging to the recycle bin out of the file catalog, the system control microcomputer 19 references the child entry number set for the entry of the recycle bin so as to detect the property entry of the file pointing to the entry of the recycle bin. Based on the information which is found set for the detected property entry and which indicates relations to other entry files, the system control microcomputer 19 detects the corresponding entries in the thumbnail entry file and text entry file. From what is recorded of the detected entries, the system control microcomputer 19 displays the thumbnails and titles. In the example of FIG. 5, both thumbnails and titles are displayed.

When the files belonging to the recycle bin are displayed, the user may select a file and give an instruction to delete that file. In that case, the system control microcomputer 19 sets the valid/invalid flag of the corresponding entry to invalid, and instructs the file management system for the optical disk 2 to delete permanently the file corresponding to the entry in question.

If the user selects a file and gives an instruction to restore that file, the system control microcomputer 19 changes the parent entry number of the file of interest in a manner pointing to a particular entry, and deletes the entry number concerning this restoration from the child entry numbers of the entries associated with the recycle bin. This simple manipulation of the index file causes the optical disk apparatus 1 to restore the virtually deleted file with ease. The entry of the file to be restored may be an entry determined by the user in advance or an entry designated by the user as needed.

(2) Operation of the First Embodiment

In the optical disk apparatus 1 of the above-described structure (FIG. 1), a video and an audio signal acquired by the video and audio pickup units are encoded by the video encoder 11 and audio encoder 12, respectively, before being converted to data streams constituting a QT movie file by the file generator 15. The QT move file is recorded to the optical disk 2 by way of a recording section made up of the memory controller 18, error-correcting codec 21, data modem 23, magnetic modulation driver 24, and optical pickup 33. In this manner, the optical disk 2 apparatus 1 records the taken pictures to the optical disk in the form of a QT movie file. The system control microcomputer 19 outputs to the recording section of the optical disk apparatus 1 data corresponding to the files recorded on the optical disk 2. The output data from the system control microcomputer 19 causes the recording section to update the management information under the file management system for the optical disk 2 in a manner reflecting the newly recorded QT movie file.

For reproduction, the QT movie file thus recorded is handled by the optical pickup 33, data modem 23, error-correcting codec 21, and memory controller 18, in that order, based on the management information under the file management system. During the process, the file data is divided by the file decoder 16 into elementary streams of video and audio data. The video and audio data streams are decoded respectively by the video decoder 13 and audio decoder 14 for output.

Upon recording of a QT move file, the optical disk apparatus 1 causes the system control microcomputer 19 to acquire thumbnail data from the file generator 15 as well as title data that may be input by the user before or after recording the file. Also acquired is information such as file names for the file management system. From these items of information acquired, the system control microcomputer 19 collects extract information about the QT movie file to be recorded onto the optical disk 2. In the optical disk apparatus 1, the system control microcomputer 19 creates in its internal memory an index file based on the acquired extract information, in the same manner as the management information associated with the file management system for the optical disk 2. The index file is recorded to the optical disk 2 along with the QT movie file. The management information for the file management system is updated in a manner reflecting the recording of the index file.

Using the index file, the optical disk apparatus 1 provides a user interface for handling the files recorded on the optical disk 2. Where numerous files are recorded on the optical disk 2, the index file-based user interface is particularly effective in improving the user's ease of operation. More specifically, as designated by the user, the optical disk apparatus 1 displays a catalog of the recorded files represented by thumbnails and titles retrieved from the index file. When the user selects a desired file from the file catalog, the optical disk apparatus 1 determines the corresponding file from what is recorded in the index file and presents the user with the file being reproduced. Given the user's similar instruction, the optical disk apparatus 1 accepts the selection of a file desired to be deleted and deletes the selected file.

When the user gives an instruction to delete a file, the optical disk apparatus 1 changes property entries in the index file in such a manner that the parent entry number set for the entry of the designated file points to the recycle bin entry. Correspondingly, the recycle bin entry is assigned the entry number of the entry subject to deletion as a child entry number set for the recycle bin entry. This arrangement allows the optical disk apparatus 1 virtually to delete the file of interest while keeping the actual file intact on the optical disk 2.

Given the user's instruction to restore a file, the optical disk apparatus 1 changes the management information which points to another entry in a manner restoring the temporarily deleted file. That is, any file placed in the virtually deleted state can be restored easily by manipulation of the index file.

In addition, the optical disk apparatus 1 leaves unchanged the other management information about each file placed in the virtually deleted state. The information kept intact makes it simpler still to restore desired files by manipulation of the index file.

That is, in response to the user's operations, the optical disk apparatus 1 displays the folders in the hierarchical structure established in the index file. On the folder display, the recycle bin entry is represented by a folder icon carrying the name "recycle bin." If the user selects the recycle bin folder, the optical disk apparatus 1 displays the thumbnails and titles of the files in the entries pointing to the recycle bin entry on the basis of the child entry numbers set for the recycle bin entry. When any given file is shown belonging to the recycle bin by use of a thumbnail and a title, the optical disk apparatus 1 allows that virtually deleted file to be recognized easily and unfailingly.

If the user gives an instruction to delete selectively a file based on the above display, the selected file is actually deleted from the optical disk 2 for permanent erasure. At this point, the valid/invalid flag of the corresponding property entry is set to invalid, whereby the entry of the deleted file is deleted from the index file.

If the user gives an instruction to select and restore a file, the parent entry number of the selected file is changed so as to point to a particular entry. The child entry number of the recycle bin entry is changed to reflect the changed parent entry number. This simple process enables the optical disk apparatus 1 to restore the temporarily deleted file.

(3) Effects of the First Embodiment

With the above-described structure in effect, the entry of the file designated to be deleted has its management information changed so as to point to the entry for temporary management. Thus simple manipulation of the index file enables the temporarily deleted file to be restored easily.

The entry management information related to other entry files and the file management information pointing to the corresponding files may be left unchanged. This feature improves the user's ease of operation and simplifies the process for restoring temporarily deleted files.

The extract information about the entries pointing to the entry for temporary management is displayed on the display unit so as to accept designation of the processing on the file related to any of the displayed entries. This feature accepts the selection of a file by thumbnail and/or by title in the same manner as before the designation of a file to be deleted, whereby the user's ease of operation is improved.

When an instruction is given to delete the file of an entry that is set to point to the entry for temporary management, the corresponding entry is deleted from the index file and the corresponding file is erased from the recording medium. This feature makes sure that any file placed in the virtually deleted state is actually deleted.

When an instruction is given to restore the file of an entry which is set to point to the entry for temporary management, the management information pointing to another entry is arranged to point to a particular entry. This feature permits easy restoration of the file from its virtually deleted state.

The instructions to delete or restore files may be accepted through the display of the extract information about the entries each pointing to the entry for temporary management. This enhances the user's ease of operation.

(4) Second Embodiment

Figures 6A, 6B:
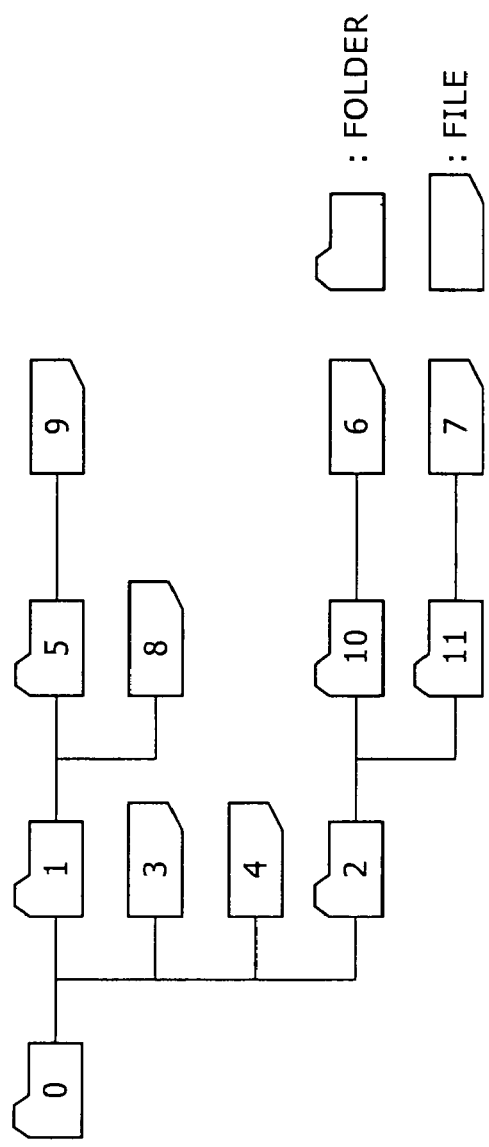
FIGS. 6A and 6B are a tabular and a schematic view, respectively, showing how property entries are made with an optical disk apparatus practiced as a second embodiment of the present invention.

FIGS. 6A and 6B are a tabular and a schematic view, respectively, showing how the property entry file E3 in the index file is structured and how the index file is organized illustratively in a hierarchical structure in conjunction with the second embodiment of the present invention. The second embodiment records to the index file the dates specific to the operations of moving files to the recycle bin entry. On the basis of the dates of the delete operations, the second embodiment carries out permanent deletion of files. The optical disk apparatus practiced as the second embodiment has basically the same structure as that of the optical disk apparatus 1 practiced as the first embodiment except that the structure of the index file is different. For that reason, the apparatus structure discussed above with reference to FIG. 1 will be cited as needed in the description that follows.

As shown in FIGS. 6A and 6B, the system control microcomputer 19 of the second embodiment creates entries of folders based on the dates on which delete instructions were given in such a manner that the created entries point to the recycle bin entry, and records the dates of deletion to the entries in question. Recording of the dates is executed by establishing date-based texts using property entry extensions or by storing date-based titles into the text entry file. Where the entry of a given folder has already been prepared together with a date of deletion, the system control microcomputer 19 skips the entry preparation for that folder.

Where the entries of folders are stored as described, the system control microcomputer 19 changes the entry of the file designated to be deleted in such a manner that the entry subject to deletion points to the recycle bin entry through the date entry. That is, with regard to the entry of the file to be deleted, the parent entry number of the entry subject to deletion is furnished with the entry number of the entry for the folder carrying the date in question, by use of the management information pointing to another entry in such a manner that the management information points to the entry of the folder carrying the corresponding date. The entry number of the file to be deleted is added to the child entry number regarding the entry of the folder carrying the date of interest.

Like the recycle bin entry, the system control microcomputer 19 displays the entries of the folders established by date in the form of folders as designated by the user.

In the examples of FIGS. 6A and 6B, instructions are given to delete the files of entries 10 and 11 carrying dates of August 15 and 16. These files are assigned the entries of the folders dated August 15 and 16 with regard to the recycle bin entry. The entries are given entry numbers 10 and 11.

As with the first embodiment, the system control microcomputer 19 displays the recycle bin entry in the form of a folder. On this display also appear icons representative of the folders whose names are given as the dates stored in connection with the recycle bin entry. If the user selects one of the folders thus dated, the file or files stored into the entry of the folder in question are displayed in the form of thumbnails and/or titles. When the user gives instructions to restore or delete permanently any of these files, the system control microcomputer 19 restores or deletes permanently the file in question in the same manner as with the first embodiment.

The second embodiment, as described, can execute permanent deletion of files based on the dates on which delete operations were carried out. This feature improves the user's ease of operation.

In addition to the user's operations, the system control microcomputer 19 checks for files that are deemed outdated, i.e., files whose dates of deletion recorded in the index file have exceeded a predetermined time limit of retention, and permanently deletes the outdated files as needed.

FIG. 7 is a flowchart of steps constituting a procedure performed by the system control microcomputer 19 of the second embodiment in order to delete a file permanently. The system control microcomputer 19 starts this procedure illustratively upon power-up or upon a change of date on an internal calendar. With the procedure started, the system control microcomputer 19 goes' from step SP1 to step SP2. More specifically, the system control microcomputer 19 detects the child entry numbers set for the recycle bin entry, and acquires successively the entries pointed to by the detected child entry numbers. During the process, the system control microcomputer 19 detects the entries of folders assigned to the recycle bin entry and, checking the dates of deletion set on the folders against the current time of day, detects the entry of any outdated folder whose date of deletion has exceeded a predetermined time limit of retention. From the child entry numbers set for the entry thus detected, the system control microcomputer 19 detects the entries of outdated files.

In step SP3, the system control microcomputer 19 having performed the above steps checks to determine whether any outdated file exists. If the result of the check in step SP3 is negative, the system control microcomputer 19 goes from step SP3 to step SP4 and terminates this procedure. If an outdated file is found, the system control microcomputer 19 goes from step SP3 to step SP5. In step SP5, the system control microcomputer 19 deletes the file in question from the index file, and deletes that file from the optical disk 2. Thereafter, the system control microcomputer 19 reaches step SP4 and brings the procedure to an end.

The system control microcomputer 19 carries out the process of deleting permanently any files which have exceeded the time limit of retention and furthermore, by the instruction of the user, deletes permanently the entries of the folders on which is set the dates of deletion from the index files, if no entries of files are stored in the folders dated.

In the manner described above, the system control microcomputer 19 deletes any files which have exceeded the time limit of retention but which are still left intact under the recycle bin entry, thereby increasing the free space on the optical disk 2.

When the entry of any file is changed so as to point to the entry for temporary management, the second embodiment records the date of that change to the index file. By referencing that date change, the second embodiment deletes permanently or restores the corresponding file accordingly. This feature improves the user's ease of operation.

The second embodiment checks the date of change against a predetermined time limit, deletes the corresponding entry from the index file depending on the result of the check, and erases the corresponding file permanently from the recording medium. In this manner, the second embodiments supplements the effects of the first embodiment with the ability to automatically delete files after checking their designated dates of deletion against the predetermined time limit of retention, whereby the user's ease of operation is enhanced.

(5) Third Embodiment

The third embodiment, like the second embodiment, records to the index file the dates on which instructions were give to delete files, displays folders in reference to user-designated dates so as to accept the user's instructions for permanent deletion or restoration of files, and permanently deletes or restores the user-designated files. At this point, the entry associated with any outdated folder is deleted. In addition, the third embodiment permanently deletes files while monitoring the free space on the optical disk 2 and displaying the files that are deemed erasable in view of their designated dates of deletion recorded in the index file. The optical disk apparatus practiced as the third embodiment has basically the same structure as that of the optical disk apparatus 1 practiced as the first embodiment except that the processing involving the index file is different. For that reason, the apparatus structure discussed above with reference to FIG. 1 will be cited as needed in the description that follows.

When the free space on the optical disk 2 is found being exhausted with progressively recorded pictures that have been taken, the system control microcomputer 19 completes the recording process on the optical disk 2 and performs the procedure shown in FIG. 8. With the procedure started, the system control microcomputer 19 goes from step SP11 to step SP12. During the process, the system control microcomputer 19 causes the file management system for the optical disk 2 to detect the free space on the recording medium, and checks to determine whether the free space has become less than a predetermined threshold value. The threshold value may be a predetermined setting, a user-designated setting, or an appropriate value calculated on the basis of past usages.

If the optical disk 2 is found to have a sufficient free space, the system control microcomputer 19 goes from step SP12 to step SP13 and terminates the procedure.

Figure 9:
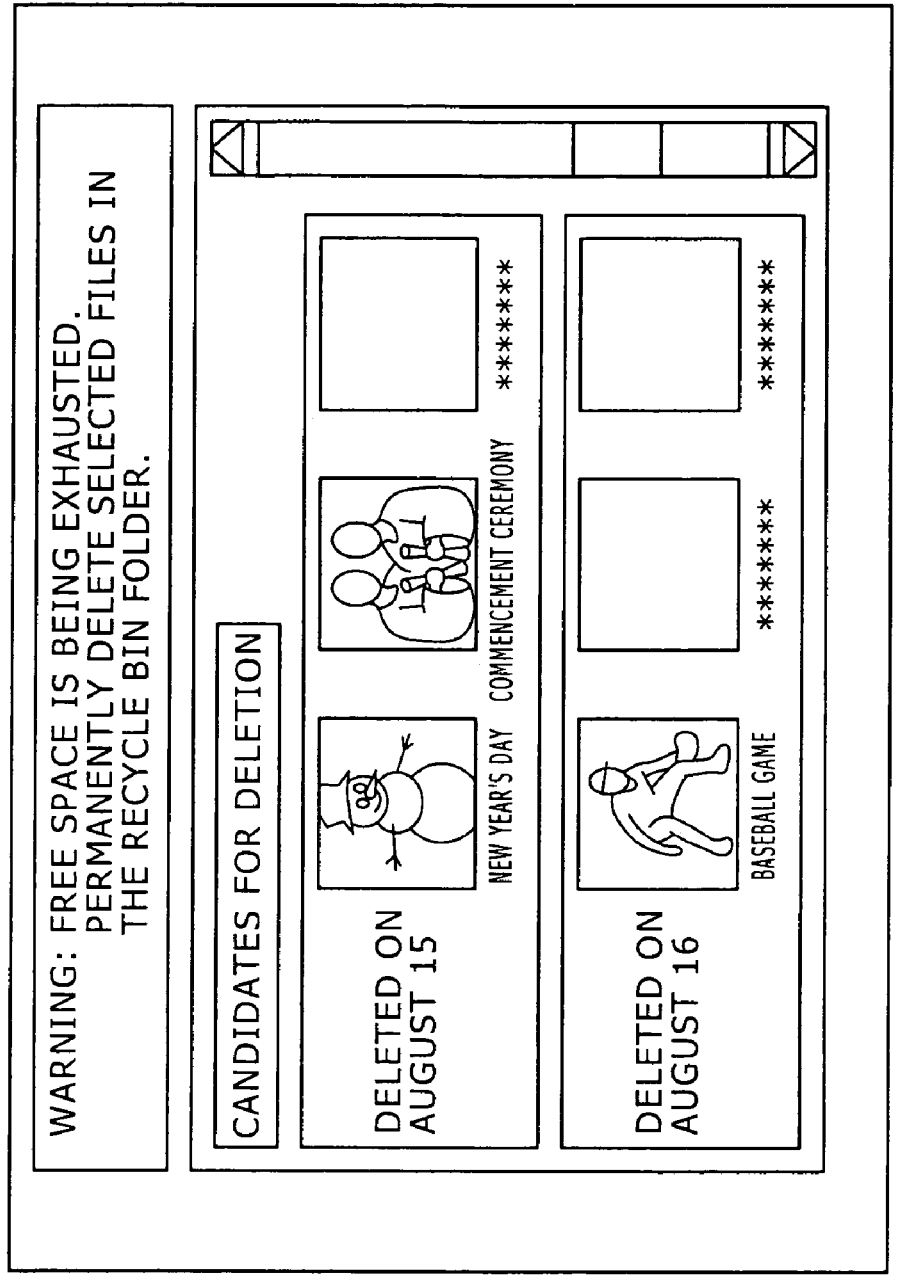
FIG. 9 is a schematic view of a typical display showing files in connection with the third embodiment.

If the free space on the optical disk 2 is found insufficient, the result of the check in step SP12 is affirmative. In that case, the system control microcomputer 19 goes from step SP12 to step SP14. In step SP14, the system control microcomputer 19 notifies the user of a decrease in available space. As shown in FIG. 9, the system control microcomputer 19 gives the notification to the user through a display on the display unit. The notification also involves informing the user that the files associated with the recycle bin entry are ready to be permanently deleted. When the permanently erasable files are presented to the user at the notification, these files are displayed using thumbnails and titles in chronological order of their designated dates of deletion stored in the index file.

When the capacity of the optical disk 2 is found exhausted, that means the pictures taken cannot be recorded continuously to the optical disk 2. In some cases, unnecessary files need to be deleted quickly to make room for the incoming pictures which then could be accommodated in the newly freed space. In such cases, according to the third embodiment, the permanently erasable files are also displayed in chronological order of their designated dates of deletion. This feature allows the user to select the files deemed truly unnecessary quickly and reliably.

On accepting the selection of the files to be deleted permanently through the file display, the system control microcomputer 19 goes from step SP14 to step SP15 and deletes the selected files permanently. Thereafter, the system control microcomputer 19 goes to step SP13 and terminates the procedure.

With the above structure in use, the entries arranged to point to the entry for temporary management are subjected to permanent deletion depending on the free space found available on the recording medium. In this manner, the third embodiment supplements the effects of the first embodiment with another feature that improves the user's ease of operation.

(6) Other Embodiments

The third embodiment above was shown displaying candidate files that can be deleted permanently on the basis of the dates of their virtual deletion. Alternatively, candidate files for deletion may be displayed after being sorted by such attribute information as dates of file creation, dates of editing, lengths and sizes, as well as by extract information such as file types and titles, all found in the index file.

For each of the above-described embodiments, it was assumed that one index file is recorded on each optical disk so that given the user's instruction to delete any file permanently, the entry of the file in question is deleted from the index file and the designated file is deleted permanently from the optical disk. Alternatively, the present invention also applies when a plurality of index files are recorded on a single recording medium. In such a case, it might happen that any given file is recorded in a plurality of index files. This requires checking to make sure that any file to be deleted permanently in the manner described above is not found in two or more index files before the file of interest is actually deleted from the optical disk. Where any file to be deleted is found in a plurality of index files, only the entry of that file is deleted from the index files.

In the foregoing description, the files assigned to the recycle bin were shown displayed using thumbnails and titles. Alternatively, other extract information may be used to display the files.

Each of the above-described embodiments was shown using the so-called external reference format (QT file format) in preparing the property entry file, thumbnail entry file, and text entry file by which to constitute the index file. Alternatively, the present invention applies extensively to embodiments creating an index file by forming extract information made up of groups of diverse attributes in integral relation to resource atoms through the use of a so-called self-contained format.

In the foregoing description, the embodiments were shown creating the index file in the QT movie file structure. Alternatively, the index file may be created in diverse formats as needed.

In the foregoing description, the present invention was shown applied to the optical disk apparatus that records pictures taken and the output from the personal computer. Alternatively, the present invention applies extensively to embodiments capable of managing numerous files recorded on diverse recording media such as magneto-optical disk and hard disk drives as well as in particular servers.

Furthermore, each of the above-described embodiments was shown recording the files subject to management and the index file on the same recording medium. Alternatively, the index file may be recorded on a recording medium different from that on which the files being managed are recorded. As another alternative, the index file may be recorded in a server different from that in which the files under management are retained.

INDUSTRIAL APPLICABILITY

The present invention applies illustratively to optical disk apparatuses.

The invention claimed is:

1. A file managing apparatus for displaying a catalog of files indicating thumbnail images and extracted text on a display unit, based on an index file recorded on a recording medium and managing files recorded on the recording medium by resorting to the index file recorded on said recording medium, in which an entry for temporary management is provided so that a file to be deleted is stored temporarily thereunder;
   wherein said index file is made up of a text entry file formed of entries of extracted text, an image entry file formed of entries of thumbnail images, and a property entry file formed of entries of properties for managing the entries of thumbnail image and the entries of extracted text, the thumbnail images being arranged to correspond with said files;
   wherein the property entry file further includes hierarchy management information which expresses a hierarchical structure of said files recorded on said recording medium;
   wherein in said property group, entries concerning said files are furnished with entry-related management information which indicates relation between the entries of thumbnail images and the entries of extracted text based on the files from which the thumbnail images and the extracted text are extracted, and with file-related management information which shows relation between the files and the entries of thumbnail images and extracted text which correspond to the files;
   wherein, when deletion of said file is instructed using the catalog of said files indicating the thumbnail images and the extracted text, displayed based on the index file, said file managing apparatus changes, with keeping said entry-related management information and said file-related management information which is set for said file to be deleted unchanged, the hierarchy management information, which is set for the entry of said file to be deleted, in such a manner that said hierarchy management information points to said entry for temporary management;
   wherein the display unit displays the thumbnail image and the extracted text about said entry furnished with said hierarchy management information which has been changed so as to point to said entry for temporary management, and
   wherein said file managing apparatus changes said hierarchy management information so as to point to a predetermined entry, when an instruction is given to restore said file associated with the entry furnished with said hierarchy management information which has been changed to point to said entry for temporary management.

2. The file managing apparatus according to claim 1, wherein, given an instruction to delete the file associated with the entry furnished with said hierarchy management information which has been changed to point to said entry for temporary management, said file managing apparatus deletes the corresponding entry from said index file and the corresponding file from said recording medium.

3. The file managing apparatus according to claim 1, wherein said file managing apparatus, when changing said hierarchy management information in such a manner as to point to said entry for temporary management, records a date of the change to said index file.

4. The file managing apparatus according to claim 3, wherein said file managing apparatus checks said date of said change against the current time of day and, depending on an outcome of the check, deletes the corresponding entry from said index file and the corresponding file from said recording medium.

5. The file managing apparatus according to claim 3, wherein said file managing apparatus sets an entry for a virtual folder with date of the change in such a manner as to point to said entry for temporary management and changes said hierarchy management information in such a manner as to point to said entry for the virtual folder.

6. A file managing method for displaying a catalog of files indicating thumbnail images and extracted text on a display unit, based on an index file recorded on a recording medium and managing files recorded on the recording medium by resorting to the index file recorded on said recording medium, in which an entry for temporary management is provided so that a file to be deleted is stored temporarily thereunder;
   wherein said index file is made up of a text entry file formed of entries of extracted text, an image entry file formed of entries of thumbnail images, and a property entry file formed of entries of properties for managing the entries of thumbnail image and the entries of extracted text, the thumbnail images being arranged to correspond with said files;
   wherein the property entry file further includes hierarchy management information which expresses a hierarchical structure of said files recorded on said recording medium; and
   wherein in said property group, entries concerning said files are furnished with entry-related management information which indicates relation between the entries of thumbnail image and the entries of extracted text based on the files from which the thumbnail images and the extracted text are extracted, and with file-related management information which indicates relation between the files and the entries of thumbnail images and extracted text corresponding to the files;
   said file managing method comprising the step of changing the hierarchy management information which is set for the entry of said file to be deleted, in such a manner that said hierarchy management information points to said entry for temporary management, with keeping said entry-related management information and said file-related management information which is set for the entry of said file to be deleted, unchanged, when deletion of said file is instructed using the catalog of said files indicating the thumbnail images and the extracted text, displayed on the index file,
   displaying thumbnail image and the extracted text about said entry furnished with said hierarchy management information which has been changed so as to point to said entry for temporary management, and changing said hierarchy management information so as to point to a predetermined entry, given an instruction to restore the file associated with the entry furnished with said hierarchy management information which has been changed to point to said entry for temporary management.

7. The file managing apparatus according to claim 4, wherein the corresponding file is deleted from said recording medium according to a lapse of a predetermined time from date of the change.

8. The file managing method according to claim 6, wherein, given an instruction to delete the file associated with the entry furnished with said hierarchy management information which has been changed to point to said entry for temporary management, the corresponding entry from said index file and the corresponding file from said recording medium are deleted.

9. The file managing method according to claim 6, wherein when changing said hierarchy management information in such a manner as to point to said entry for temporary management, a date of the change to said index file is recorded.

10. The file managing method according to claim 9, wherein said date of said change against the current time of day is checked and, depending on an outcome of the check, deletes the corresponding entry from said index file and the corresponding file from said recording medium.

11. The file managing method according to claim 9, wherein an entry for a virtual folder with date of the change is set in such a manner as to point to said entry for temporary management and changes said hierarchy management information in such a manner as to point to said entry for the virtual folder.

12. The file managing method according to claim 10, wherein the corresponding file is deleted from said recording medium according to a lapse of a predetermined time from date of the change.

* * * * *